(12) United States Patent
Hu

(10) Patent No.: US 10,009,799 B2
(45) Date of Patent: Jun. 26, 2018

(54) METHOD FOR SWITCHING STANDBY MODE, USER EQUIPMENT UE, AND NETWORK DEVICE

(71) Applicant: Huawei Technologies Co., Ltd., Shenzhen, Guangdong (CN)

(72) Inventor: Wen Hu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 182 days.

(21) Appl. No.: 15/099,279

(22) Filed: Apr. 14, 2016

(65) Prior Publication Data

US 2016/0227447 A1 Aug. 4, 2016

Related U.S. Application Data

(63) Continuation of application No. PCT/CN2014/088558, filed on Oct. 14, 2014.

(30) Foreign Application Priority Data

Oct. 14, 2013 (CN) .......................... 2013 1 0478557

(51) Int. Cl.
*H04W 4/00* (2018.01)
*H04W 36/00* (2009.01)
(Continued)

(52) U.S. Cl.
CPC ....... *H04W 36/0022* (2013.01); *H04W 76/27* (2018.02); *H04W 60/005* (2013.01)

(58) Field of Classification Search
CPC ................................................ H04W 36/0022
See application file for complete search history.

(56) References Cited

U.S. PATENT DOCUMENTS

2010/0061305 A1   3/2010  Kubo
2010/0323695 A1*  12/2010 Kallio .................. H04W 48/18
                                                     455/435.2
(Continued)

FOREIGN PATENT DOCUMENTS

CN      1937808 A     3/2007
CN    101835246 A     9/2010
(Continued)

OTHER PUBLICATIONS

3rd Generation Partnership Project; Technical Specification Group Services and System Aspects; Circuit Switched Fallback in Evolved Packet System; Stage 2 (Release 8), 3GPP TS 23.272 V8.0.0 (Jun. 2008), 41 pages.

(Continued)

*Primary Examiner* — Gerald A Smarth

(57) ABSTRACT

The present invention discloses a method, including: when user equipment camps on a first network, sending, by the UE to a network device, a single-domain registration request needed when the network device performs mobility management on the UE. The single-domain registration request carries a first IE, and the first IE identifies that the UE has a CS domain voice capability. The UE is a single card dual standby terminal, the UE is currently in a standby state in both the first network and a second network, the first network supports a PS domain service, and the second network supports a CS domain service. If the UE receives a second IE fed back according to the single-domain registration request by the network device, exiting, by the UE, the standby state in the second network, where the second IE identifies that the first network supports CSFB.

20 Claims, 3 Drawing Sheets

When user equipment UE camps on a first network, the UE sends, to a network side, a single-domain registration request needed when the network side performs mobility management on the UE, where the single-domain registration request carries a first information element IE, and the first IE identifies that the UE has a circuit-switched CS domain voice capability, where the UE is a single card dual standby terminal, the UE is currently in a standby state in both the first network and a second network, the first network supports a packet switched PS domain service, and the second network supports a CS domain service — S101

If the UE receives a second IE fed back according to the single-domain registration request by the network device, the UE exits the standby state in the second network, where the second IE identifies that the first network supports circuit switched fallback CSFB — S102

(51) Int. Cl.
*H04W 76/27* (2018.01)
*H04W 60/00* (2009.01)

(56) References Cited

U.S. PATENT DOCUMENTS

| | | |
|---|---|---|
| 2011/0092198 A1 | 4/2011 | Miyata |
| 2012/0170503 A1* | 7/2012 | Kelley .................. H04W 48/06 370/312 |
| 2012/0302239 A1* | 11/2012 | Hu ..................... H04W 36/0022 455/436 |
| 2013/0231112 A1 | 9/2013 | Zhang |
| 2013/0267226 A1 | 10/2013 | Liu et al. |
| 2014/0349662 A1* | 11/2014 | Ekici .................. H04W 76/026 455/450 |

FOREIGN PATENT DOCUMENTS

| | | |
|---|---|---|
| CN | 101867986 A | 10/2010 |
| CN | 102316554 A | 1/2012 |
| CN | 102404815 A | 4/2012 |
| CN | 102625416 A | 8/2012 |

OTHER PUBLICATIONS

"3rd Generation Partnership Project; Technical Specification Group Services and System Aspects; Circuit Switched (CS) fallback in Evolved Packet System (EPS); Stage 2 (Release 12)", 3GPP TS 23.272 V12.0.0, Sep. 2013, 97 pages.

"3rd Generation Partnership Project; Technical Specification Group Core Network and Terminals; Mobile radio interface Layer 3 specification; Core network protocols; Stage 3 (Release 12)", 3GPP TS 24.008 V12.3.0, Sep. 2013, 683 pages.

"3rd Generation Partnership Project; Technical Specification Group Core Network and Terminals; Non-Access-Stratum (NAS) protocol for Evolved Packet System (EPS); Stage 3 (Release 12)", 3GPP TS 24.301 V12.2.0, Sep. 2013, 352 pages.

"LTE/TD-SCDMA/GSM Multi-mode Terminal Technology Specification—CSFB (version 1.0.0)", Chellona Mobile Communications Corporation Cmcc, Sep. 26, 2010, 45 pages.

"4G Multi-Mode Multi-Band Device Requirements and Architectures", A GTI White Paper, Version 1.0, Sep. 2012, 48 pages.

Vodafone; "Which nodes should/should not perform paging retransmission when using SGs?"; 3GPP TSG-SA WG 2 Meeting #75E; S2-096362; Change Request; Oct. 2009; 4 pages.

* cited by examiner

METHOD FOR SWITCHING STANDBY MODE, USER EQUIPMENT UE, AND NETWORK DEVICE

CROSS-REFERENCE TO RELATED APPLICATIONS

This application is a continuation of International Application No. PCT/CN2014/088558, filed on Oct. 14, 2014, which claims priority to Chinese Patent Application No. 201310478557.1, filed on Oct. 14, 2013, both of which are hereby incorporated by reference in their entireties.

TECHNICAL FIELD

The present invention relates to the field of communications technologies, and in particular, to a method for switching a standby mode, a user equipment (UE), and a network device.

BACKGROUND

Introduction to Terms

GSM: Global System for Mobile communications, Global System for Mobile Communications, is currently a most widely used mobile telephone standard. GSM is considered as a second-generation (2G) mobile telephone system.

TD-SCDMA: time-division synchronous CDMA, is a synchronous code division multiple access system that is put forward by China and uses a time division duplex technology. TD-SCDMA is a third-generation (3G) mobile communications system.

LTE: Long Term Evolution, Long Term Evolution, is a long term evolution of a UMTS technical standard formulated by the 3GPP organization. Key transmission technologies such as OFDM technology and multiple-LTE-antenna MIMO are introduced in an LTE system, so that spectral efficiency and a data transmission rate (a peak rate can reach 50 Mbit/s in the uplink, and 100 Mbit/s in the downlink) are remarkably increased and multiple bandwidth allocations such as 1.4 MHz, 3 MHz, 5 MHz, 10 MHz, 15 MHz, 20 MHz are supported, and therefore spectrum allocation is more flexible and a system capacity and system coverage are remarkably improved. An LTE radio network architecture is flatter, which reduces a system delay and decreases network construction and maintenance costs. The LTE system supports an interoperation with another 3GPP system. LTE is a fourth-generation (4G) mobile communications system.

A single card dual standby terminal refers to a terminal that can support two types of networks by using one card. For example, two types of networks are supported: a TD-SCDMA network and a GSM network, or an LTE network and a GSM network. Moreover, the terminal can implement a CS (Circuit switched, circuit switched) domain service by using a GSM/TD-SCDMA network and implement a PS (packet switched, packet switched) domain service by using an LTE/TD-SCDMA network. The CS domain service includes a telephone service, a short message service, and an additional service (for example, a call transfer service and a call restriction service). The PS domain service specifically refers to an Internet access service.

CSFB: Circuit Switched Fallback, circuit switched fallback, is a standard voice service transitional solution defined by the 3GPP at an initial stage of the introduction of LTE. The essence of CSFB lies in that a terminal still uses an existing network (for example, a 2G network or a 3G network) to perform, in a conventional CS domain bearer manner, a voice service, and LTE processes only a PS domain service. When needing to process a CS domain service, user equipment under the coverage of LTE is switched to a CS domain in an original 2G network/3G network to process the service, which therefore achieves an objective of reusing an existing CS domain resource to provide a conventional voice service to the user equipment in an LTE network.

The single card dual standby terminal mentioned in this application specifically refers to an LTE single card dual standby terminal defined by a communications operator in China. The single card dual standby terminal has two communications modules, which can be simultaneously connected to different networks. For example, the two communications modules in the single card dual standby terminal are a first communications module and a second communications module, where the second communications module can be connected to a GSM network, and the first communications module can be connected to an LTE/TD-SCDMA network (either LTE or TD-SCDMA can be selected). Therefore, the single card dual standby terminal has the following capabilities:

(1) Be in a standby state and work in both LTE and GSM networks.

(2) Be in a standby state and work in both TD-SCDMA and GSM networks.

(3) Be in a standby state and work in only a GSM network, or be in a standby state and work in only an LTE/TD-SCDMA network.

In single card dual standby mode, the single card dual standby terminal can be connected to the GSM network by using the second communications module, and implements a CS domain service by using the GSM network. Meanwhile, the single card dual standby terminal can be further connected to the LTE/TD-SCDMA network by using the first communications module, and implements a PS domain service by using the LTE/TD-SCDMA network.

However, the single card dual standby terminal in the prior art has at least the following technical problems:

1. In single card dual standby mode, the single card dual standby terminal has a technical problem of relatively high power consumption because both the communications modules of the single card dual standby terminal are in a standby state.

2. In single card dual standby mode, the single card dual standby terminal has a technical problem of interference in radio frequency because both the communications modules of the single card dual standby terminal are using signal radio frequency.

3. In single card dual standby mode, the single card dual standby terminal has a technical problem of occupying more air interface resources because the two communications modules of the single card dual standby terminal are simultaneously connected to a network.

In conclusion, in single card dual standby mode, the single card dual standby terminal in the prior art has technical problems that power consumption is relatively high, interference occurs in radio frequency, and a relatively large quantity of air interface resources are occupied.

SUMMARY

Embodiments of this application provide a method for switching a standby mode, user equipment UE, and a network device, thereby resolving technical problems in the prior art that power consumption is relatively high, interference occurs in radio frequency, and a relatively large quantity of air interface resources are occupied, which occur when a single card dual standby terminal is in single card dual standby mode.

According to a first aspect, a method for switching a standby mode is provided, including:

when a user equipment (UE) camps on a first network, sending, by the UE to a network device, a single-domain registration request needed when the network device performs mobility management on the UE, where the single-domain registration request carries a first information element (IE), and the first IE identifies that the UE has a circuit-switched (CS) domain voice capability, where the UE is a single card dual standby terminal, the UE is currently in a standby state in both the first network and a second network, the first network supports a packet switched PS domain service, and the second network supports a CS domain service; and exiting, by the UE, the standby state in the second network when the UE receives a second IE fed back according to the single-domain registration request by the network device, where the second IE identifies that the first network supports circuit switched fallback (CSFB).

With reference to the first aspect, in a first possible implementation manner, the single-domain registration request includes:

a PS-domain attach (ATTACH) registration request; or
a PS-domain tracking area update (TAU) registration request.

With reference to the first aspect or the first possible implementation manner of the first aspect, in a second possible implementation manner, the method further includes:

initiating, by the UE to the network device, an ATTACH registration request for combining a PS domain and a CS domain; or initiating, by the UE to the network device, a TAU registration request for combining a PS domain and a CS domain.

With reference to the first aspect, the first possible implementation manner of the first aspect, or the second possible implementation manner of the first aspect, in a third possible implementation manner, the first network is a Long Term Evolution (LTE) network, and the second network is a second-generation mobile communications technology (2G) network or a third-generation mobile communications technology (3G) network.

With reference to the first aspect, the first possible implementation manner of the first aspect, the second possible implementation manner of the first aspect, or the third possible implementation manner of the first aspect, in a fourth possible implementation manner, the first IE is Voice domain preference and UE's usage setting, and content of Voice domain preference for E-UTRAN in the first IE is CS Voice only; and the second IE is Additional update result.

With reference to the first aspect or the foregoing implementation manners of the first aspect, in a fifth possible implementation manner, the method further includes:

if the UE fails to receive the second IE, keeping the UE in a standby state in both the first network and the second network.

According to a second aspect, a method for switching a standby mode is provided, including:

receiving a single-domain registration request that is sent by user equipment (UE) camping on a first network and that is needed when a network device performs mobility management on the UE;

if the single-domain registration request carries a first information element (IE), and the first IE identifies that the UE has a circuit switched CS voice capability, determining whether the first network supports circuit switched fallback (CSFB); and when the first network supports CSFB, feeding back a second IE to the UE, to indicate to the UE that the first network supports CSFB.

With reference to the second aspect, in a first possible implementation manner, the single-domain registration request includes:

a PS-domain attach (ATTACH) registration request; or
a PS-domain tracking area update (TAU) registration request.

With reference to the second aspect or the first possible implementation manner of the second aspect, in a second possible implementation manner, the first network is a Long Term Evolution (LTE) network.

With reference to the second aspect, the first possible implementation manner of the second aspect, or the second possible implementation manner of the second aspect, in a third possible implementation manner, the first IE is Voice domain preference and UE's usage setting, and content of Voice domain preference for E-UTRAN in the first IE is CS Voice only; and the second IE is Additional update result.

According to a third aspect, a UE is provided, including:

a sending unit, configured to: when the UE camps on a first network, send, to a network device, a single-domain registration request needed when the network device performs mobility management on the UE, where the single-domain registration request carries a first IE, and the first IE identifies that the UE has a CS domain voice capability, where the UE is a single card dual standby terminal, the UE is currently in a standby state in both the first network and a second network, the first network supports a packet switched PS domain service, and the second network supports a CS domain service; and an exit unit, configured to: if the UE receives a second IE fed back according to the single-domain registration request by the network device, exit the standby state of the UE in the second network, where the second IE identifies that the first network supports CSFB.

With reference to the third aspect, in a first possible implementation manner, the single-domain registration request includes:

a PS-domain attach (ATTACH) registration request; or
a PS-domain tracking area update (TAU) registration request.

With reference to the third aspect or the first possible implementation manner of the third aspect, in a second possible implementation manner, the UE further includes:

a first initiation unit, configured to initiate, to the network device, an ATTACH registration request for combining a PS domain and a CS domain; or a second initiation unit, configured to initiate, to the network device, a TAU registration request for combining a PS domain and a CS domain.

With reference to the third aspect, the first possible implementation manner of the third aspect, or the second possible implementation manner of the third aspect, in a third possible implementation manner, the first network is a Long Term Evolution LTE network, and the second network is a second-generation mobile communications technology 2G network or a third-generation mobile communications technology 3G network.

With reference to the third aspect, the first possible implementation manner of the third aspect, the second possible implementation manner of the third aspect, or the third possible implementation manner of the third aspect, in a fourth possible implementation manner, the first IE is Voice domain preference and UE's usage setting, and content of Voice domain preference for E-UTRAN in the first IE is CS Voice only; and the second IE is Additional update result.

With reference to the third aspect or the foregoing implementation manners of the third aspect, in a fifth possible implementation manner, the UE further includes:

a keeping unit, configured to: if the UE fails to receive the second IE, keep the UE in a standby state in both the first network and the second network.

According to a fourth aspect, a network device is provided, including:

a receiving unit, configured to receive a single-domain registration request that is sent by user equipment UE camping on a first network and that is needed when the network device performs mobility management on the UE;

a determining unit, configured to receive the single-domain registration request from the receiving unit, and determine, if the single-domain registration request carries a first information element IE, and the first IE identifies that the UE has a circuit switched CS voice capability, whether the first network supports circuit switched fallback CSFB; and a feedback unit, configured to: when the first network supports CSFB, feedback a second IE to the UE, to indicate to the UE that the first network supports CSFB.

With reference to the fourth aspect, in a first possible implementation manner, the single-domain registration request includes:

a PS-domain attach ATTACH registration request; or a PS-domain tracking area update TAU registration request.

With reference to the fourth aspect or the first possible implementation manner of the fourth aspect, in a second possible implementation manner, the first network is a Long Term Evolution LTE network.

With reference to the fourth aspect, the first possible implementation manner of the fourth aspect, or the second possible implementation manner of the fourth aspect, in a third possible implementation manner, the first IE is Voice domain preference and UE's usage setting, and content of Voice domain preference for E-UTRAN in the first IE is CS Voice only; and the second IE is Additional update result.

According to a fifth aspect, a user equipment (UE) is provided, including:

a first communications device and a second communications device; and a processor, connected to the first communications device and the second communications device, where the processor is configured to: when the UE camps on a first network, send, by using the first communications device to a network device, a single-domain registration request needed when the network device performs mobility management on the UE, where the single-domain registration request carries a first IE, and the first IE identifies that the UE has a CS domain voice capability, where the UE is a single card dual standby terminal; the UE is currently in a standby state in the first network by using the first communications device and in a standby state in a second network by using the second communications device, thereby implementing that the UE is currently in a standby state in both the first network and the second network; and the first network supports a PS domain service, and the second network supports a CS domain service; and if the UE receives a second IE fed back according to the single-domain registration request by the network device, exit the standby state of the second communications device in the second network, where the second IE identifies that the first network supports CSFB.

With reference to the fifth aspect, in a first possible implementation manner, the single-domain registration request includes:

a PS-domain attach (ATTACH) registration request; or a PS-domain tracking area update (TAU) registration request.

With reference to the fifth aspect or the first possible implementation manner of the fifth aspect, in a second possible implementation manner, the processor is further configured to:

initiate, by using the first communications device to the network device, an ATTACH registration request for combining a PS domain and a CS domain; or initiate, by using the first communications device to the network device, a TAU registration request for combining a PS domain and a CS domain.

With reference to the fifth aspect, the first possible implementation manner of the fifth aspect, or the second possible implementation manner of the fifth aspect, in a third possible implementation manner, the first network is a LTE network, and the second network is a 2G network or a 3G network.

With reference to the fifth aspect, the first possible implementation manner of the fifth aspect, the second possible implementation manner of the fifth aspect, or the third possible implementation manner of the fifth aspect, in a fourth possible implementation manner, the first IE is Voice domain preference and UE's usage setting, and content of Voice domain preference for E-UTRAN in the first IE is CS Voice only; and the second IE is Additional update result.

With reference to the fifth aspect or the foregoing possible implementation manners of the fifth aspect, in a fifth possible implementation manner, the processor is further configured to:

if the UE fails to receive the second IE, keep a standby state in the first network by using the first communications device and keep a standby state in the second network by using the second communications device, so that the UE stays in a standby state in both the first network and the second network.

According to a sixth aspect, a network device is provided, including:

a transceiver; and a processor, connected to the transceiver, and configured to: receive, by using the transceiver, a single-domain registration request that is sent by user equipment (UE) camping on a first network and that is needed when the network device performs mobility management on the UE; if the single-domain registration request carries a first IE, and the first IE identifies that the UE has a CS module voice capability, determine whether the first network supports CSFB; and when the first network supports CSFB, feedback, by using the transceiver, a second IE to the UE, to indicate to the UE that the first network supports CSFB.

With reference to the sixth aspect, in a first possible implementation manner, the single-domain registration request includes:

a PS-domain attach (ATTACH) registration request; or a PS-domain tracking area update (TAU) registration request.

With reference to the sixth aspect or the first possible implementation manner of the sixth aspect, in a second possible implementation manner, the first network is a LTE network.

With reference to the sixth aspect, the first possible implementation manner of the sixth aspect, or the second possible implementation manner of the sixth aspect, in a third possible implementation manner, the first IE is Voice domain preference and UE s usage setting, and content of Voice domain preference for E-UTRAN in the first IE is CS Voice only; and the second IE is Additional update result.

The technical solutions in the embodiments of this application have the following beneficial effects:

In the embodiments of this application, a method for switching a standby mode is disclosed, including: when user equipment UE camps on a first network, sending, by the UE to a network device, a single-domain registration request needed when the network device performs mobility management on the UE, where the single-domain registration request carries a first IE, and the first IE identifies that the UE has a CS domain voice capability, where the UE is a single card dual standby terminal, the UE is currently in a standby state in both the first network and a second network, the first network supports a packet switched PS domain service, and the second network supports a CS domain service; and if the UE receives a second IE fed back according to the single-domain registration request by the network device, exiting, by the UE, the standby state in the second network, where the second IE identifies that the first network supports CSFB. In the embodiments of this application, after single card dual standby UE learns that a first network on which the UE currently camps supports CSFB, the UE adjusts a "single card dual standby mode" to a "CSFB single card single standby mode", where in single card dual standby mode, the UE is in a standby state in the first network and the second network, and in single card single standby mode, the UE is only in a standby state in the first network, so as to implement a PS domain service in the first network and a CS domain service that is based on CSFB, thereby effectively resolving technical problems in the prior art that when a single card dual standby terminal is in single card dual standby mode, power consumption is relatively high, interference occurs in radio frequency, and a relatively large quantity of air interface resources are occupied, so as to achieve, under the premise of ensuring that a CS domain service and a PS domain service are performed successfully, technical effects of reducing power consumption, eliminating interference in radio frequency, and reducing occupied air interfaces.

DETAILED DESCRIPTION

Figure 1:
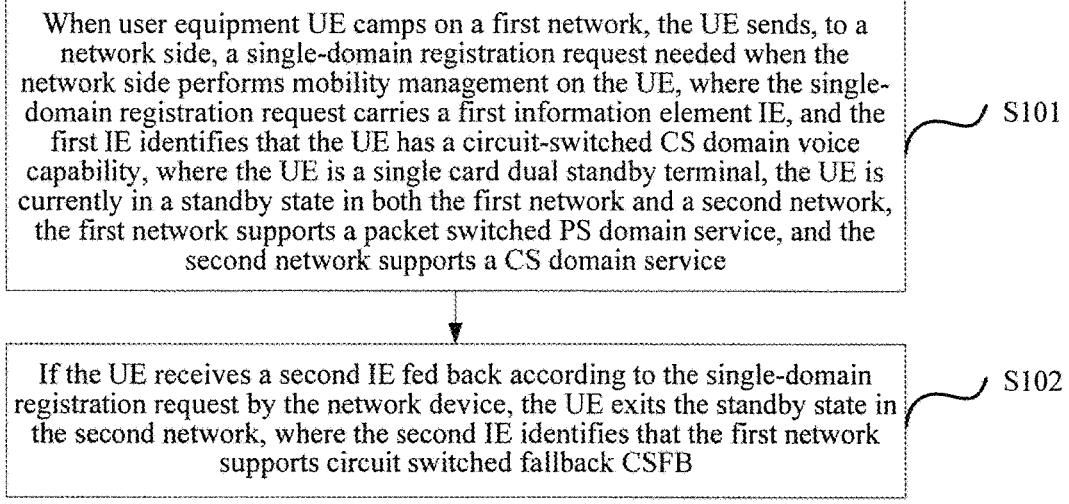
FIG. 1 is a flowchart of a method for switching a standby mode (on a side of user equipment) according to Embodiment 1 of this application.

Embodiments of this application provide a method for switching a standby mode, thereby resolving technical problems in the prior art that when a single card dual standby terminal is in single card dual standby mode, power consumption is relatively high, interference occurs in radio frequency, and a relatively large quantity of air interface resources are occupied.

To resolve the foregoing technical problems, a general concept of the technical solutions in the embodiments of this application is as follows: a method for switching a standby mode. The method includes: when user equipment UE camps on a first network, sending, by the UE to a network device, a single-domain registration request needed when the network device performs mobility management on the UE, where the single-domain registration request carries a first information element IE, and the first IE identifies that the UE has a circuit-switched CS domain voice capability, where the UE is a single card dual standby terminal, the UE is currently in a standby state in both the first network and a second network, the first network supports a packet switched PS domain service, and the second network supports a CS domain service; and if the UE receives a second IE fed back according to the single-domain registration request by the network device, exiting, by the UE, the standby state in the second network, where the second IE identifies that the first network supports circuit switched fallback CSFB.

In this specification, various aspects are described in combination with user equipment and/or a network device.

The user equipment is an LTE single card dual standby wired or wireless terminal. A wireless terminal may refer to a device providing a user with voice and/or data connectivity, a handheld device having a wireless connection function, or another processing device connected to a wireless modem. The wireless terminal may communicate with one or more core networks by using a radio access network (RAN). The wireless terminal may be a mobile terminal, for example, a mobile telephone (or referred to as a "cellular" phone) or a computer having a mobile terminal, which may be, for example, a portable, pocket-sized, handheld, computer built-in, or vehicle-mounted mobile apparatus. The wireless terminal exchanges language and/or data with the radio access network. The wireless terminal are, for example, a personal communication service (PCS) telephone, a cordless telephone, a Session Initiation Protocol (SIP) phone, a wireless local loop (WLL) station, a personal digital assistant (PDA). The wireless terminal may also be referred to as a system, a subscriber unit, a subscriber station, a mobile station, a remote station, an access point, a remote terminal, an access terminal, a user terminal, a User Agent, user equipment, or subscriber's installation.

The network device may be an MME (Mobility Management Entity, mobility management entity) device in an LTE network, or may be another device, which is not specifically limited in this application.

In addition, the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

Embodiment 1

In this embodiment, on a side of UE (User Equipment, user equipment), a method for switching a standby mode is provided. As shown in FIG. 1, the method includes:

Step S101: When the UE camps on a first network, the UE sends, to a network device, a single-domain registration request needed when the network device performs mobility management on the UE, where the single-domain registration request carries a first information element IE (Information Element), and the first IE identifies that the UE has a circuit-switched CS domain voice capability, where the UE is a single card dual standby terminal, the UE is currently in a standby state in both the first network and a second network, the first network supports a packet switched PS domain service, and the second network supports a CS domain service.

Step S102: If the UE receives a second IE fed back according to the single-domain registration request by the network device, the UE exits the standby state in the second network, where the second IE identifies that the first network supports circuit switched fallback CSFB.

In a specific implementation process, the UE has two communications modules, that is, a first communications module and a second communications module. In step S101, in single card dual standby mode, the UE is connected to the first network and the second network by using the first communications module and the second communications module respectively, so as to implement a PS domain service based on the first network and a CS domain service based on the second network. Because the first communications module and the second communications module need to work simultaneously, there are technical problems that power consumption is relatively high, interference occurs in radio frequency, and a relatively large quantity of air interface resources are occupied.

In a specific implementation process, if the first network supports CSFB, based on CSFB, the UE may rely on only the first communications module to simultaneously implement a CS domain service and a PS domain service. For example, when needing to perform a PS domain service, the UE is connected to the first network by using the first communications module to implement the PS domain service. When needing to perform a CS domain service, the UE is connected to the second network by using the first communication module to implement the CS domain service. In step S102, after learning, by using the second IE, that the first network supports CSFB, the UE disables the second communications module, and switches a "single card dual standby mode" to a "CSFB single card single standby mode", so as to rely on the first communications module to implement the CS domain service and the PS domain service simultaneously.

In a specific implementation process, the UE chooses to disable the second communications module when the second communications module currently has no CS domain service. In this case, a standby mode of the UE is switched from a "single card dual standby mode" to a "single card single standby mode".

In this embodiment of this application, after single card dual standby UE learns that a first network on which the UE currently camps supports CSFB, the UE adjusts a "single card dual standby mode" to a "CSFB single card single standby mode", where in single card dual standby mode, the UE is in a standby state in both the first network and a second network, and in single card single standby mode, the UE is in a standby state in only the first network, so as to implement a PS domain service in the first network and a CS domain service that is based on CSFB, thereby effectively resolving technical problems in the prior art that when a single card dual standby terminal is in single card dual standby mode, power consumption is relatively high, interference occurs in radio frequency, and a relatively large quantity of air interface resources are occupied, so as to achieve, under the premise of ensuring that a CS domain service and a PS domain service are performed successfully, technical effects of reducing power consumption, eliminating interference in radio frequency, and reducing occupied air interfaces.

In this embodiment of this application, optionally, the single-domain registration request includes:

a PS-domain attach ATTACH registration request; and/or a PS-domain tracking area update TAU registration request.

In the prior art, upon being powered on, the UE receives system information delivered by a network device, so that the UE is registered in a network corresponding to the network device; or upon entering a new tracking area, UE receives system information delivered by a network device, so that the UE is registered in the new tracking area. Upon being powered on, the UE needs to initiate an attach ATTACH procedure of single-domain (that is, a PS domain in an LTE network) registration, so as to meet a requirement of the network device for performing mobility management on the UE. Upon entering a new tracking area, the UE needs to initiate a TAU (Tracking area update, tracking area update) procedure of single-domain (that is, a PS domain in an LTE network) registration, so as to meet a requirement of the network device for performing mobility management on the UE.

In this embodiment of this application, the first IE used to query whether a current LTE network supports a CSFB service may be carried in a single-domain ATTACH registration request (and/or single-domain TAU registration request), and sent to the network device, thereby achieving a technical effect of determining, in an ATTACH or TAU procedure, whether the first network supports CSFB.

In this embodiment of this application, optionally, the method further includes:

initiating, by the UE to the network device, an ATTACH registration request for combining a PS domain and a CS domain; or initiating, by the UE to the network device, a TAU registration request for combining a PS domain and a CS domain.

In a specific implementation process, after exiting a standby state in the second network, the UE further needs to initiate, to the network device, an ATTACH registration request or a TAU registration request for combining a PS domain and a CS domain, so as to ensure that a CSFB service is performed successfully.

In this embodiment of this application, optionally, the first network is a Long Term Evolution LTE network; and the second network is a second-generation mobile communications technology 2G network (for example, a GSM network) or a third-generation mobile communications technology 3G network (for example, a TD-SCDMA network).

In this embodiment of this application, optionally, the first IE is Voice domain preference and UE's usage setting (voice domain preference and preference setting), and content of Voice domain preference for E-UTRAN (voice domain preference for an evolved UMTS Terrestrial radio access network) in the first IE is CS Voice only (CS domain voice); and the second IE is Additional update result (an additional update result).

In a specific implementation process, Voice domain preference and UE's usage setting is used to query a network device on whether the first network supports CSFB, and CS Voice only represents that the UE has a circuit-switched CS domain voice capability and can perform a CSFB service.

In a specific implementation process, a first IE may also be another IE except Voice domain preference and UE's usage setting, which is not specifically limited herein.

Because a single-domain registration ATTACH or TAU request in the prior art does not include the IE: Voice domain preference and UE's usage setting, in this embodiment of this application, if the IE Voice domain preference and UE's usage setting is added to the single-domain registration ATTACH or TAU request, an ATTACH or TAU procedure of single-domain registration is not affected.

Further, it is acquired that a current Long Term Evolution LTE network supports circuit switched fallback CSFB service by using information: a second IE. In this case, step S102 is specifically: receiving, by the UE, a single-domain registration request response (for example, an ATTACH request response or a TAU request response) that is sent by the network device and that carries the second IE.

In a specific implementation process, the second IE may also be another IE except Additional update result, which is not specifically limited herein. Moreover, specific content of Additional update result is not specifically limited in this embodiment of this application either.

In this embodiment of this application, optionally, the method further includes: if the UE fails to receive the second IE, keeping, by the UE, in the standby state in both the first network and the second network.

Because the UE fails to receive the second IE from the network device, the UE cannot determine whether the first network supports CSFB and cannot use CSFB in the first network to implement PS domain and CS domain services. Therefore, the UE needs to stay in a single card dual standby mode.

Embodiment 2

Figure 2:
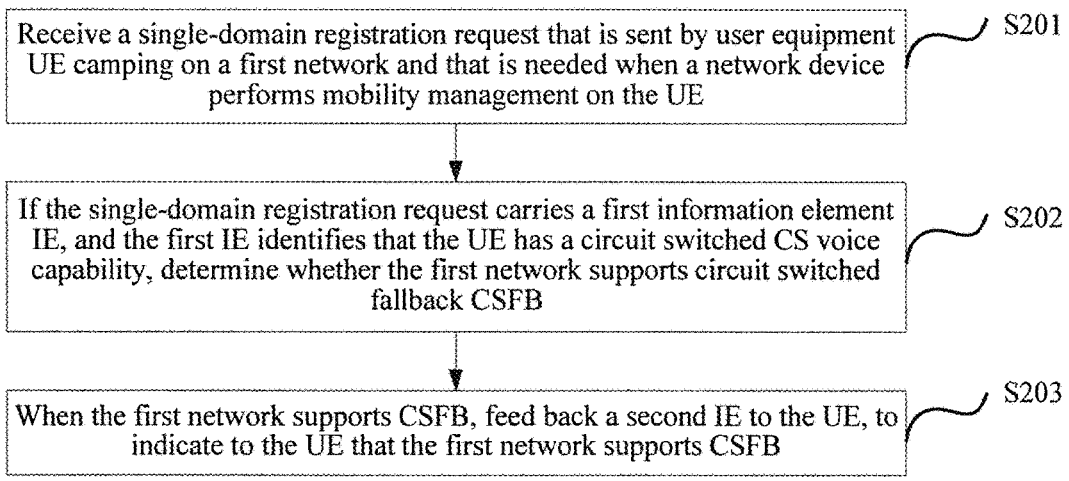
FIG. 2 is a flowchart of a method for switching a standby mode (on a side of a network device) according to Embodiment 2 of this application.

Based on a same inventive concept, in this embodiment, on a side of a network device, a method for switching a standby mode is provided. As shown in FIG. 2, the method includes:

Step S201: Receive a single-domain registration request that is sent by user equipment UE camping on a first network and that is needed when a network device performs mobility management on the UE.

Step S202: If the single-domain registration request carries a first information element IE, and the first IE identifies that the UE has a circuit switched CS voice capability, determine whether the first network supports circuit switched fallback CSFB.

Step S203: When the first network supports CSFB, feed back a second IE to the UE, to indicate to the UE that the first network supports CSFB.

In a specific implementation process, the network device may determine, by searching for related configuration information, stored in the network device, of a current LTE network, whether the current LTE network supports a CSFB service.

In this embodiment of this application, optionally, the single-domain registration request includes:
a PS-domain attach ATTACH registration request; and/or
a PS-domain tracking area update TAU registration request.

In this embodiment, optionally, the first network is a Long Term Evolution LTE network.

In this embodiment, optionally, the first IE is Voice domain preference and UE's usage setting, used to query whether the first network supports a CSFB; content of Voice domain preference for E-UTRAN in the first IE is CS Voice only, used to identify that UE has a circuit switched CS voice capability; and the second IE is Additional update result, used to identify that the first network supports a CSFB.

In a specific implementation process, the second IE may be another IE except Additional update result, which is not specifically limited herein. Moreover, specific content of Additional update result is not specifically limited in this embodiment of this application either.

In the prior art, an ATTACH or TAU registration request response returned by the network device to the UE does not carry the second IE: Additional update result. However, in this embodiment of this application, after the network device determines that the current LTE network supports a CSFB service, the network device adds the second IE: Additional update result to the ATTACH or TAU registration request response, so as to notify the UE of that the first network supports CSFB service.

Figure 2A:
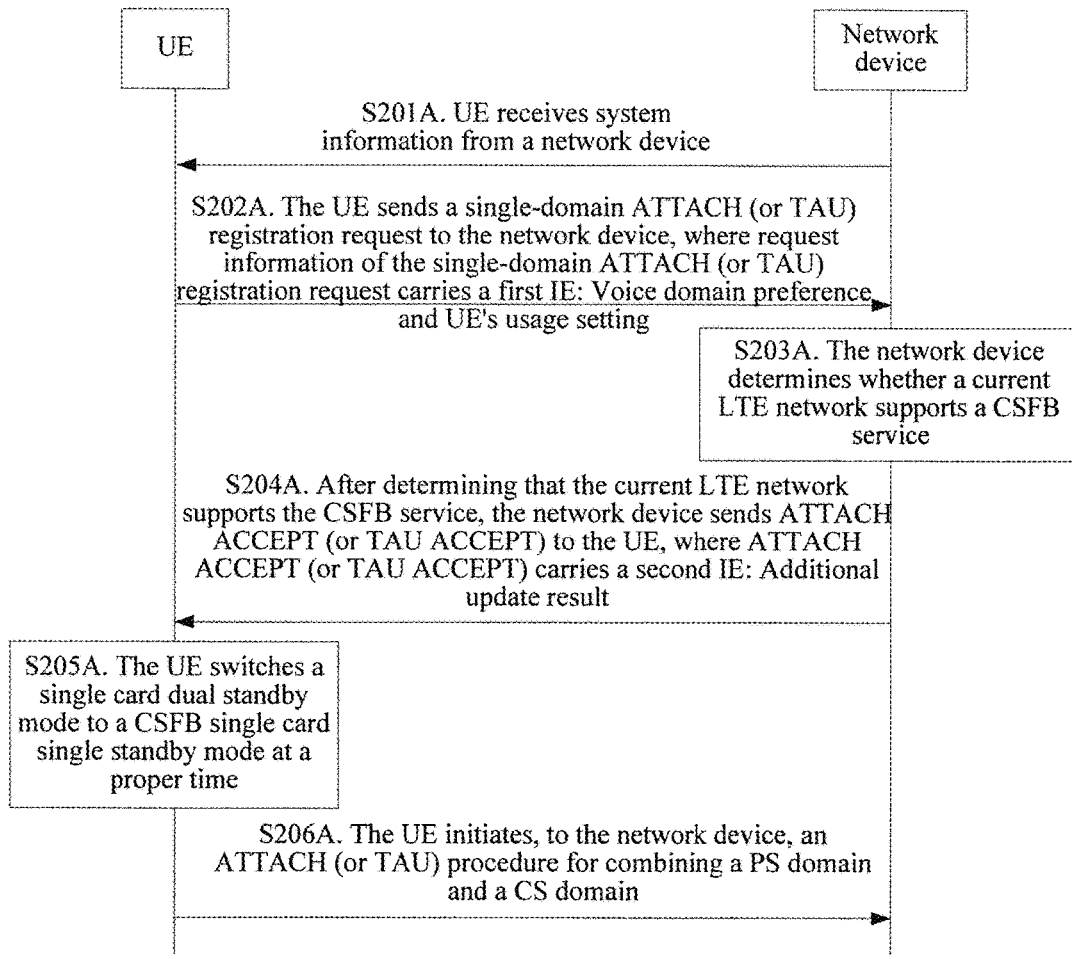
FIG. 2A is a flowchart of a method for switching a standby mode (on an interaction side of user equipment and a network device) according to Embodiment 2 of this application.

To better understand the technical solution provided in this application, the following provides a method for switching a standby mode on an interaction side of user equipment and a network device. As shown in FIG. 2A, the method includes:

Step S201A: UE receives system information from a network device.

Step S202A: The UE sends a single-domain ATTACH (or TAU) registration request to the network device, where the ATTACH (or TAU) registration request carries a first IE: Voice domain preference and UE's usage setting, which is used to query the network device on whether a current LTE network supports CSFB.

Step S203A: The network device determines whether the current LTE network supports CSFB.

Step S204A: After determining that the current LTE network supports CSFB, the network device sends ATTACH ACCEPT (an attach registration request response) or TAU ACCEPT (an attach registration request response) to the UE, where ATTACH ACCEPT (or TAU ACCEPT) carries a second IE: Additional update result, which is used to identify that the LTE network supports CSFB.

Step S205A: The UE switches a "single card dual standby mode" to a "CSFB single card single standby mode" at a proper time. In a specific implementation process, the proper time is a time when the UE currently has no CS domain service.

Step S206A: The UE sends, to the network device, an ATTACH (or TAU) procedure for combining a PS domain and a CS domain.

Embodiment 3

Figure 3:
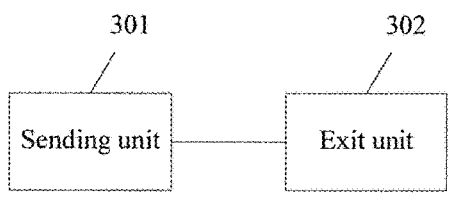
FIG. 3 is a functional block diagram of user equipment according to Embodiment 3 of this application.

Based on a same inventive concept, user equipment UE in this embodiment, as shown in FIG. 3, includes:
a sending unit 301, configured to: when the UE camps on a first network, send, to a network device, a single-domain registration request needed when the network device performs mobility management on the UE, where the single-domain registration request carries a first information element IE, and the first IE identifies that the UE has a circuit-switched CS domain voice capability, where the UE is a single card dual standby terminal, the UE is currently in a standby state in both the first network and a second network, the first network supports a packet switched PS domain service, and the second network supports a CS domain service; and an exit unit 302, configured to: if the UE receives a second IE fed back according to the single-domain registration request by the network device, exit the standby state of the UE in the second network, where the second IE identifies that the first network supports circuit switched fallback CSFB.

In this embodiment, optionally, the single-domain registration request includes:

a PS-domain attach ATTACH registration request; or a PS-domain tracking area update TAU registration request.

In this embodiment, optionally, the UE further includes:

a first initiation unit, configured to initiate, to the network device, an ATTACH registration request for combining a PS domain and a CS domain; and/or a second initiation unit, configured to initiate, to the network device, a TAU registration request for combining a PS domain and a CS domain.

In this embodiment, optionally, the first network is a Long Term Evolution LTE network; and the second network is a second-generation mobile communications technology 2G network or a third-generation mobile communications technology 3G network.

In this embodiment, optionally, the first IE is Voice domain preference and UE's usage setting, and content of Voice domain preference for E-UTRAN in the first IE is CS Voice only; and the second IE is Additional update result.

In this embodiment, optionally, the UE further includes:

a keeping unit, configured to: if the UE fails to receive the second IE, keep the UE in a standby state in both the first network and the second network.

Embodiment 4

Figure 4:
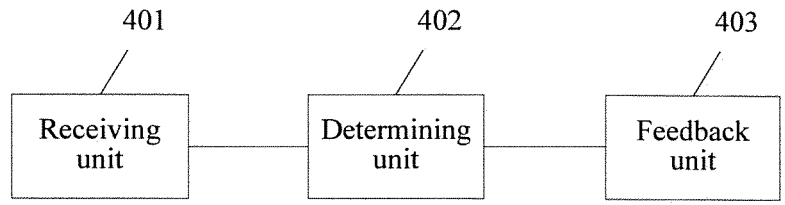
FIG. 4 is a functional block diagram of a network device according to Embodiment 4 of this application.

Based on a same inventive concept, a network device in this embodiment, as shown in FIG. 4, includes:

a receiving unit 401, configured to receive a single-domain registration request that is sent by user equipment UE camping on a first network and that is needed when the network device performs mobility management on the UE;

a determining unit 402, configured to: receive the single-domain registration request from the receiving unit 401, and if the single-domain registration request carries a first information element IE, and the first IE identifies that the UE has a circuit switched CS voice capability, determine whether the first network supports circuit switched fallback CSFB; and a feedback unit 403, configured to: when the first network supports CSFB, feed back a second IE to the UE, to indicate to the UE that the first network supports CSFB.

In this embodiment, optionally, the single-domain registration request includes:

a PS-domain attach ATTACH registration request; or a PS-domain tracking area update TAU registration request.

In this embodiment, optionally, the first network is a Long Term Evolution LTE network.

In this embodiment, optionally, the first IE is Voice domain preference and UE's usage setting, and content of Voice domain preference for E-UTRAN in the first IE is CS Voice only; and the second IE is Additional update result.

Embodiment 5

Figure 5:
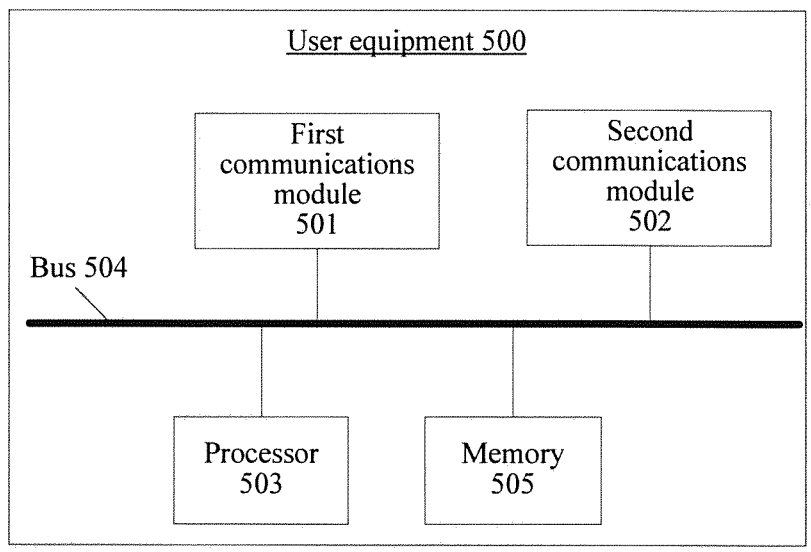
FIG. 5 is a concept diagram of an example of hardware implementation of user equipment according to Embodiment 5 of this application.

Based on a same inventive concept, user equipment (User Equipment, UE for short) 500 in this embodiment, as shown in FIG. 5, includes:

a first communications module 501 and a second communications module 502; and a processor 503, connected to the first communications module 501 and the second communications module 502 by using a bus 504, where the processor 503 is configured to: when the user equipment 500 camps on a first network, send, by using the first communications module 501 to a network device, a single-domain registration request needed when the network device performs mobility management on the user equipment 500, where the single-domain registration request carries a first information element IE, and the first IE identifies that the UE has a circuit-switched CS domain voice capability, where the user equipment 500 is a single card dual standby terminal; the user equipment 500 is currently in a standby state in the first network by using the first communications module 501 and in a standby state in a second network by using the second communications module 502, thereby implementing that the UE is currently in a standby state in both the first network and the second network; and the first network supports a packet switched PS domain service, and the second network supports a CS domain service; and if the user equipment 500 receives a second IE fed back according to the single-domain registration request by the network device, exit the standby state of the second communications module 502 in the second network, where the second IE identifies that the first network supports circuit switched fallback CSFB.

In this embodiment, optionally, the user equipment 500 further includes:

a memory 505, connected to the bus 504, and configured to store the single-domain registration request, the first IE, the second IE, and the like.

In this embodiment, optionally, the single-domain registration request includes:

a PS-domain attach ATTACH registration request; and/or a PS-domain tracking area update TAU registration request.

In this embodiment, optionally, the processor 503 is further configured to initiate, by using the first communications module 501 to the network device, an ATTACH registration request for combining a PS domain and a CS domain; or initiate, by using the first communications module 501 to the network device, a TAU registration request for combining a PS domain and a CS domain.

In this embodiment, optionally, the first network is a Long Term Evolution LTE network; and the second network is a second-generation mobile communications technology 2G network or a third-generation mobile communications technology 3G network.

In this embodiment, optionally, the first IE is Voice domain preference and UE's usage setting, and content of Voice domain preference for E-UTRAN in the first IE is CS Voice only; and the second IE is Additional update result.

In this embodiment, optionally, the processor 503 is further configured to: if the user equipment 500 fails to receive the second IE, keep a standby state of the first communications module 501 in the first network and keep a standby state of the second communications module 502 in the second network, so that the user equipment 500 keeps in the standby state in both the first network and the second network.

Embodiment 6

Figure 6:
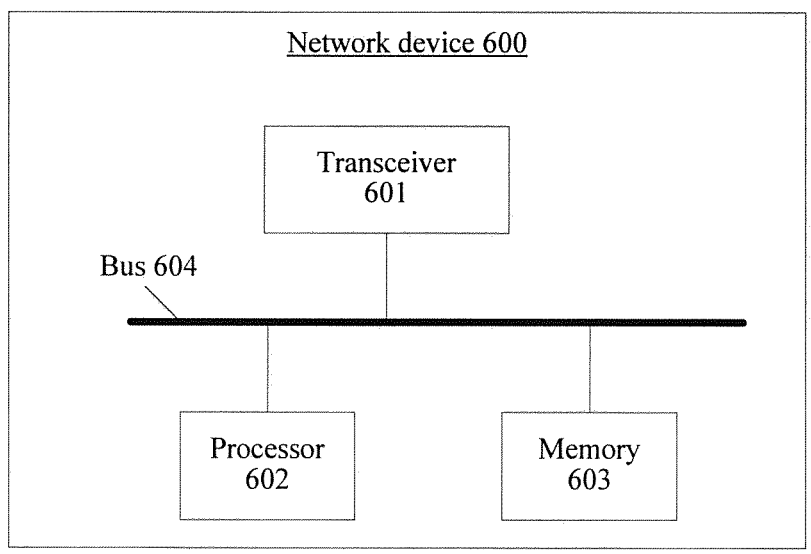
FIG. 6 is a concept diagram of an example of hardware implementation of a network device according to Embodiment 6 of this application.

Based on a same inventive concept, a network device 600 in this embodiment, as shown in FIG. 6, includes:

a transceiver 601; and a processor 602, connected to the transceiver 601 by using a bus 604, and configured to: receive a single-domain registration request that is sent by user equipment UE camping on a first network and that is needed when the network device 600 performs mobility management on the UE; if the single-domain registration request carries a first information element IE, and the first IE identifies that the UE has a circuit switched CS voice capability, determine whether the first network supports circuit switched fallback CSFB; and when the first network supports CSFB, feed back a second IE to the UE, to indicate to the UE that the first network supports CSFB.

In this embodiment, optionally, the network device 600 further includes:

a memory 603, connected to the bus 604, and configured to store information such as the single-domain registration request, the first information element IE, and the second IE.

In this embodiment, optionally, the single-domain registration request includes:

a PS-domain attach ATTACH registration request; and/or a PS-domain tracking area update TAU registration request.

In this embodiment, optionally, the first network is a Long Term Evolution LTE network.

In this embodiment, optionally, the first IE is Voice domain preference and UE's usage setting, and content of Voice domain preference for E-UTRAN in the first IE is CS Voice only; and the second IE is Additional update result.

A person skilled in the art should understand that the embodiments of the present invention may be provided as a method, a system, or a computer program product. Therefore, the present invention may use a form of hardware only embodiments, software only embodiments, or embodiments with a combination of software and hardware. Moreover, the present invention may use a form of a computer program product that is implemented on one or more computer-usable storage media (including but not limited to a disk memory, a CD-ROM, an optical memory, and the like) that include computer-usable program code.

The present invention is described with reference to the flowcharts and/or block diagrams of the method, the device (system), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some preferred embodiments of the present invention have been described, persons skilled in the art can make changes and modifications to these embodiments once they learn the basic inventive concept. Therefore, the following claims are intended to be construed as to cover the preferred embodiments and all changes and modifications falling within the scope of the present invention.

Obviously, a person skilled in the art can make various modifications and variations to the present invention without departing from the spirit and scope of the present invention. The present invention is intended to cover these modifications and variations provided that they fall within the scope of protection defined by the following claims and their equivalent technologies.

What is claimed is:

1. A method for switching a standby mode, the method comprising:

when a user equipment (UE) camps on a first network, sending, by the UE, to a network device, a single-domain registration request before the network device performs mobility management on the UE, wherein the single-domain registration request carries a first information element (IE), and the first IE identifies that the UE has a circuit-switched (CS) domain voice capability, wherein the UE is a single card dual standby terminal, the UE is currently in a standby state in both the first network and a second network, the first network supports a packet switched (PS) domain service, and the second network supports a CS domain service; and exiting, by the UE, the standby state in the second network when the UE receives a second IE fed back by the network device according to the single-domain registration request, wherein the second IE identifies that the first network supports circuit switched fallback (CSFB).

2. The method according to claim 1, wherein the single-domain registration request comprises:

a PS-domain attach (ATTACH) registration request; or a PS-domain tracking area update (TAU) registration request.

3. The method according to claim 1, further comprising:

initiating, by the UE to the network device, an ATTACH registration request or a TAU registration request for combining a PS domain and a CS domain.

4. The method according to claim 1, wherein the first network is a Long Term Evolution (LTE) network, and the second network is a second-generation mobile communications technology (2G) network or a third-generation mobile communications technology (3G) network.

5. The method according to claim 1, wherein the first IE is a Voice domain preference and UE's usage setting IE, and content of Voice domain preference for evolved UMTS Terrestrial radio access network (E-UTRAN) in the first IE is CS Voice only; and the second IE is an Additional update result IE.

6. The method according to claim 1, further comprising: remaining, by the UE, in the standby state in both the first network and the second network when the UE fails to receive the second IE.

7. A method for switching a standby mode, the method comprising:
receiving a single-domain registration request sent by a user equipment (UE) camping on a first network before a network device performs mobility management on the UE;
determining whether the first network supports circuit switched fallback (CSFB) when the single-domain registration request carries a first information element (IE), and the first IE identifies that the UE has a circuit switched (CS) domain voice capability; and
when the first network supports CSFB, feeding back a second IE to the UE, to indicate to the UE that the first network supports CSFB.

8. The method according to claim 7, wherein the single-domain registration request comprises:
a PS-domain attach (ATTACH) registration request; or
a PS-domain tracking area update (TAU) registration request.

9. The method according to claim 7, wherein the first network is a Long Term Evolution (LTE) network.

10. The method according to claim 7, wherein the first IE is a Voice domain preference and UE's usage setting IE, and content of Voice domain preference for evolved UMTS Terrestrial radio access network (E-UTRAN) in the first IE is CS Voice only; and the second IE is an Additional update result IE.

11. A user equipment (UE), comprising:
a first communications device and a second communications device; and
a processor, connected to the first communications device and the second communications device, wherein the processor is configured to:
when the UE camps on a first network, send, to a network device by using the first communications device, a single-domain registration request before the network device performs mobility management on the UE, wherein the single-domain registration request carries a first information element (IE), and the first IE identifies that the UE has a circuit-switched (CS) domain voice capability, wherein the UE is a single card dual standby terminal; the UE is currently in a standby state in the first network by using the first communications device and in a standby state in a second network by using the second communications device, thereby implementing that the UE is currently in a standby state in both the first network and the second network; and the first network supports a packet switched (PS) domain service, and the second network supports a CS domain service, and
exit the standby state of the second communications device in the second network when the UE receives a second IE fed back by the network device according to the single-domain registration request, wherein the second IE identifies that the first network supports circuit switched fallback (CSFB).

12. The UE according to claim 11, wherein the single-domain registration request comprises:
a PS-domain attach (ATTACH) registration request; or
a PS-domain tracking area update (TAU) registration request.

13. The UE according to claim 11, wherein the processor is further configured to:
initiate, by using the first communications device to the network device, an ATTACH registration request for combining a PS domain and a CS domain; or
initiate, by using the first communications device to the network device, a TAU registration request for combining a PS domain and a CS domain.

14. The UE according to claim 11, wherein the first network is a Long Term Evolution (LTE) network, and the second network is a second-generation mobile communications technology (2G) network or a third-generation mobile communications technology (3G) network.

15. The UE according to claim 11, wherein the first IE is a Voice domain preference and UE's usage setting IE, and content of Voice domain preference for evolved UMTS Terrestrial radio access network (E-UTRAN) in the first IE is CS Voice only; and the second IE is an Additional update result IE.

16. The UE according to claim 11, wherein the processor is further configured to:
when the UE fails to receive the second IE, keep the first communications device in a standby state in the first network and keep the second communications device in a standby state in the second network, so that the UE stays in a standby state in both the first network and the second network.

17. A network device, comprising:
a transceiver; and
a processor, connected to the transceiver, and configured to:
receive, by using the transceiver, a single-domain registration request that sent by a user equipment (UE) camping on a first network, the single-domain registration request received before the network device performs mobility management on the UE,
when the single-domain registration request carries a first information element (IE), and the first IE identifies that the UE has a circuit switched (CS) domain voice capability, determine whether the first network supports circuit switched fallback (CSFB), and
when the first network supports CSFB, feedback, by using the transceiver, a second IE to the UE, to indicate to the UE that the first network supports CSFB.

18. The network device according to claim 17, wherein the single-domain registration request comprises:
a PS-domain attach (ATTACH) registration request; or
a PS-domain tracking area update (TAU) registration request.

19. The network device according to claim 17, wherein the first network is a Long Term Evolution (LTE) network.

20. The network device according to claim 17, wherein the first IE is a Voice domain preference and UE's usage setting IE, and content of Voice domain preference for evolved UMTS Terrestrial radio access network (E-UTRAN) in the first IE is CS Voice only; and the second IE is an Additional update result IE.

* * * * *